United States Patent [19]
Stuller

[11] 3,768,856
[45] Oct. 30, 1973

[54] ROLL-OVER PROTECTION CAB
[75] Inventor: Howard E. Stuller, Lubbock, Tex.
[73] Assignee: Clark Equipment Company, Buchanan, Mich.
[22] Filed: Oct. 4, 1971
[21] Appl. No.: 185,983

[52] U.S. Cl............ 296/28 C, 180/89 R, 280/150 C
[51] Int. Cl............................................. B62d 33/06
[58] Field of Search....................... 296/28 C, 102; 180/89 R; 280/150 C

[56] References Cited
UNITED STATES PATENTS
3,527,474 9/1970 Boersma ........................ 280/150 C
2,845,133 7/1958 Norrie et al..................... 296/28 C FOREIGN PATENTS OR APPLICATIONS
87,011 7/1956 Denmark ............................ 180/89
1,497,236 8/1967 France ............................ 296/28 C Primary Examiner—Benjamin Hersh
Assistant Examiner—J. A. Pekar
Attorney—Kenneth C. Witt et al.

[57] ABSTRACT

An off-highway vehicle having an energy absorption structure which protectively houses the operator and is permitted a limited arcuate movement about an axis parallel to the vehicle centerline when side thrusts or vertical loads are encountered above a predetermined minimum load such as might occur if the vehicle were to upset or roll on its side.

7 Claims, 4 Drawing Figures

Patented Oct. 30, 1973

INVENTOR
HOWARD E. STULLER
BY Jack E. Oliver

ATTORNEY

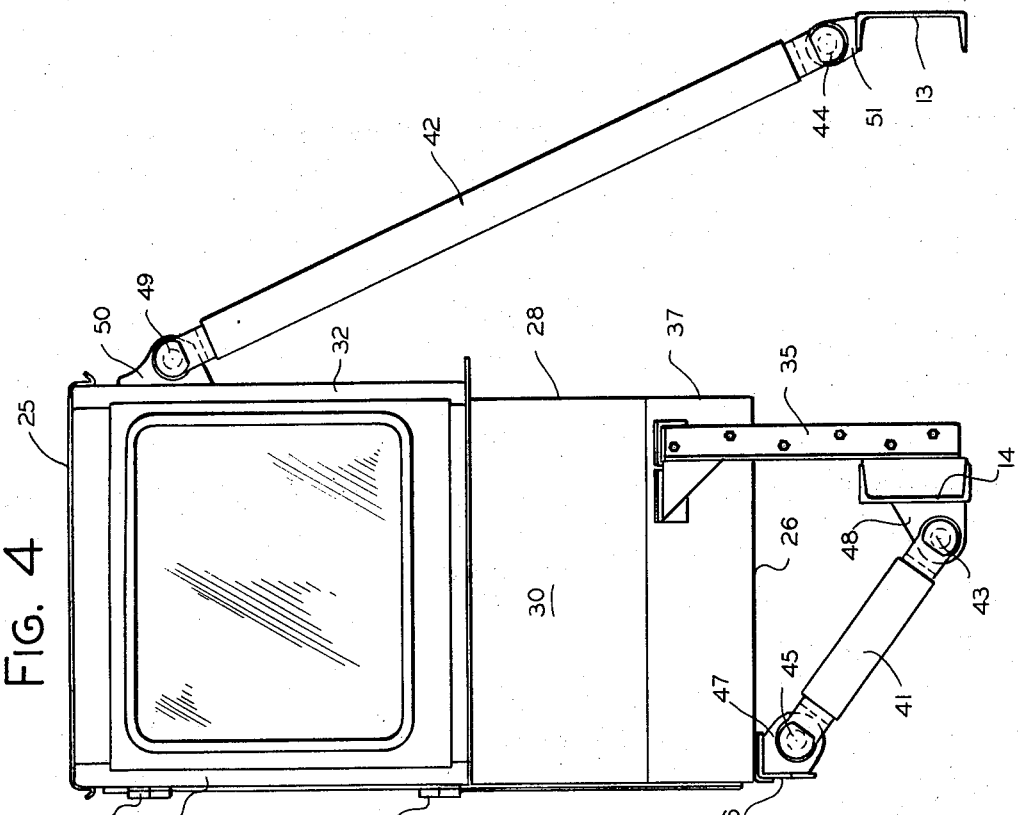
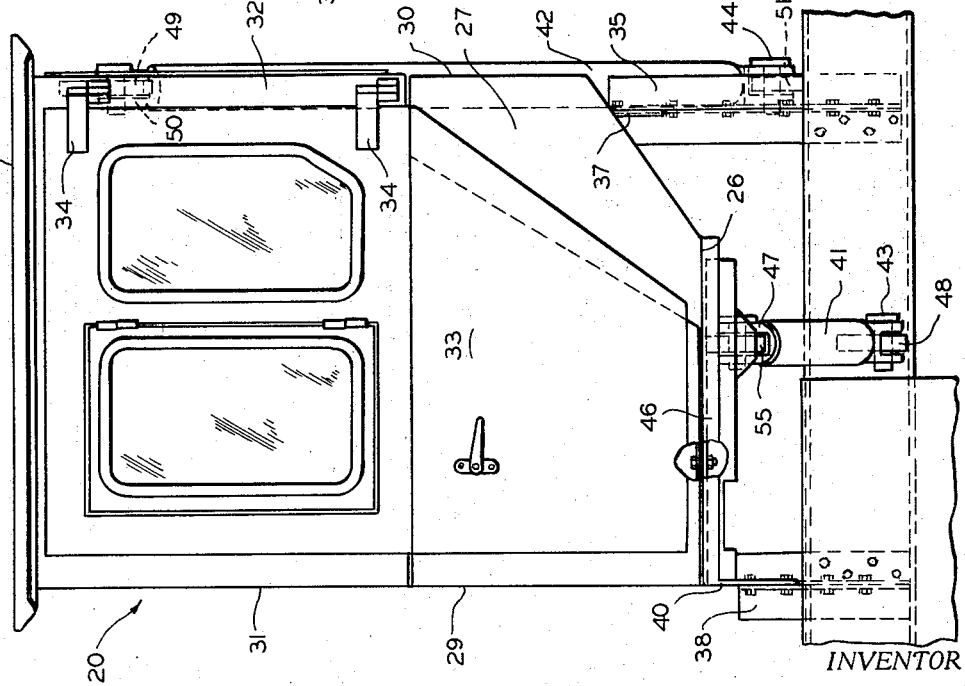

ROLL-OVER PROTECTION CAB

BACKGROUND OF THE INVENTION

1. Field of the Invention

The invention pertains to operator protective structures on a vehicle, particularly off-highway type equipment, where the operator sits above ground level in a cab or cockpit in which the steering and other vehicle controls are located.

2. Background of Prior Art

Off-highway equipment such as tractor scrapers, dump trucks, dozers and the like are often required to work in rugged terrain. A tractor scraper will have a tractor on which the operator rides and a scraper articulated on the rear of the tractor. In hilly or mountainous country, side hill cuts are often made where the land rises on one side of the cut and dips away on the other. If the operator turns the tractor uphill too sharply after making a cut, a shift in the center of gravity of the tractor scraper unit will occur, which may produce a dangerous roll-over condition.

Dozers may be used on moderate side slopes. However, in spite of the apparent stability of such machines, they are quite likely to be upset unless care is used. A dozer which appears to have an ample margin of safety may suddenly flip on its side by running over a stone with a higher track at the same moment the lower track enters hollow or soft ground.

A loaded dump truck is particularly subject to roll-over when the dump body is raised into the dumping position and the rear wheels are on a slope. Any slant will cause the center of gravity of the body to rapidly shift downhill as the dump body is raised. The twisting force may either break loose the dump body hinges or overturn the truck.

It is known to protect the operator by the use of roll bars or some other heavy structural member extending over the operator's position to guard against injury in the event of a roll-over accident where the vehicle weight would otherwise possibly crush the operator. These protective measures are successful to a point and certainly are better than an open cockpit, but they often obscure the vision of the operator because of their size and location.

Moreover, known types of roll-over protection make it difficult to enclose the operator's cockpit area to protect him and the vehicle controls from the weather and more importantly, to provide more complete overall safety protection such as against small objects being hurled by the tires which might otherwise not be stopped by such known devices.

SUMMARY OF THE INVENTION

A vehicle comprises a protective structure for housing the operator which encloses a space defining a critical zone around the operator's position. Motion restraining structure is connected to the protective structure permitting limited arcuate movement about an axis parallel to the centerline of the vehicle in case of loads above a minimum which would otherwise tend to crush the protective structure into the operator's critical zone wherein the excess energy is dissipated by deflection of the motion restraining structure.

The motion restraining structure, in the preferred embodiment of the invention, is a pair of rigid links, one attached near the top of the protective structure and another attached near the bottom, each link pivoting at its lower end to one of the vehicle frame side rails.

The protective structure may be made in the form of a relatively light cab-shell having sheet metal side walls. A relatively large expanse of window area may be provided to permit clear visibility in all directions. The cab-shell is capable of withstanding ordinary side thrusts, but in a roll-over situation, where the entire weight of the vehicle may be applied, it will deflect or deform slightly while energy in excess of that which would crush the shell into the operator's critical zone is absorbed by permitting the motion restraining structure to pivot maintaining the integrity of the cab-shell.

Moreover, portions of the vehicle body in the path of deflection are so designed as to preferentially collapse or crush, rather than the shell, thus acting as back-up or additional energy absorbing structure.

Other advantages and objects of the invention will become more apparent by reference to the following detailed description of the invention which proceeds with a description of drawings.

DESCRIPTION OF THE DRAWINGS

FIGS. 3 and 4 are respectively left side and rear end views of the cab-shell and restraining link structure.

DESCRIPTION OF PREFERRED EMBODIMENT

Figure 1:
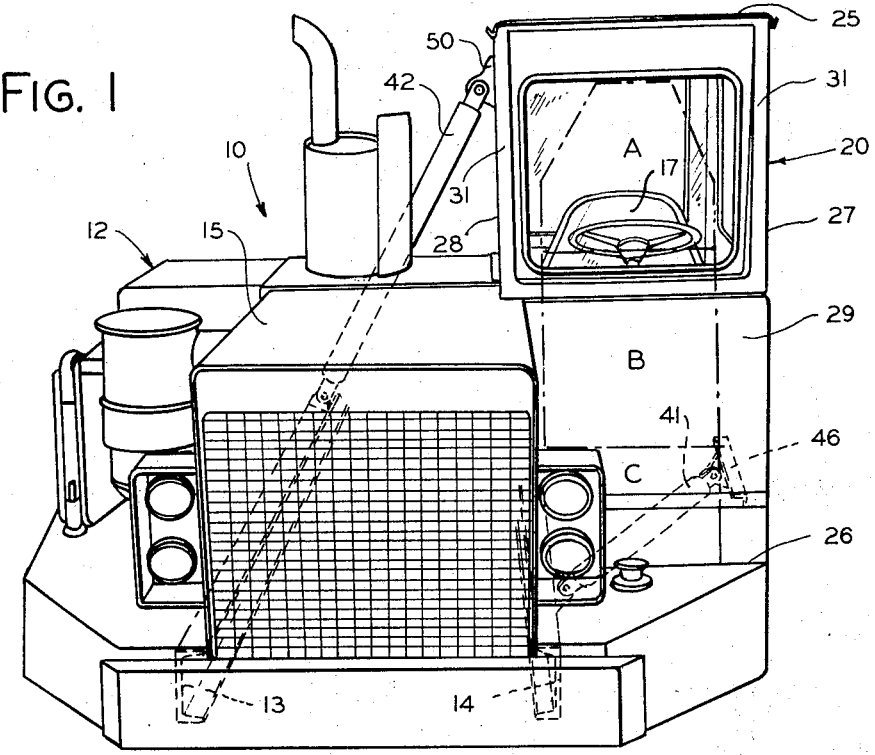
FIG. 1 is a front elevational, perspective view of a vehicle having the operator's seat housed within a protective structure which, in accordance with the preferred embodiment of the invention, is a cab-shell pivotally connected to the vehicle frame side rails by restraining links.

FIG. 1 shows a vehicle 10, which may be the tractor of a self-propelled tractor scraper unit, although the invention is not limited to tractor scrapers and is considered equally applicable to any vehicle, but particularly off-highway motorized equipment which is usually required to operate in rough terrain. The vehicle 10 has a body 12 which is mounted on laterally spaced, longitudinally extending, right and left frame side rails 13–14 on the opposite sides of the vehicle centerline. An engine space is provided at the forward end of and between the side rails 13–14. An engine cover or hood 15 encloses, at least partially, the engine space. An operator's seat 17 is positioned above and laterally outboard of the left side rail 14. Surrounding the operator's seat 17 and extending vertically above and below, fore and aft, and from side to side thereof are three critical zones; (A) generally encompassing the operator's head and chest area; (B) surrounding the torso region; and (C) around the legs and feet area; which zones A, B, and C define, for a seated operator, critical zones of protection for a roll-over protective structure in accordance with the characteristics and dimensions for operators of construction and industrial machinery prescribed by SAE Standard J-397.

The critical zones A, B, and C generally conform to the configuration of a seated operator and are dimensioned from a seat reference point adjacent the lower back of the seat measuring vertically 42–44 inches, laterally about 28 inches, and in the fore and aft direction 33–37 inches at the widest part. Zone C is measured approximately from the front of the seat forwardly some 16–18 inches. These dimensions are for reference only and pertain particularly to a seated operator, however it will be appreciated that other critical zone dimensions will apply in other circumstances; for example, if the operator is normally standing when operating the vehicle.

Enclosing the critical zones A, B, and C and housing the operator, is a protective structure or cab-shell 20 having top, bottom and side walls 25, 26, 27, 28, 29, and 30. As shown in FIGS. 3–4 the cab-shell 20 is relatively lightly framed having a sheet metal skin with window openings in the side for vision of the operator in all directions. A box frame having front and rear corner posts 31–32 supports the top 25, left and right side walls 27–28, and front and rear walls 29–30. The left side wall 27 has a door 33 hinged at 34 which may be swung open to provide access for the operator to the compartment and seat 17.

The cab-shell 20 is supported at the right rear corner 37 by a vertical bracket 35 bolted to the left side rail 14 and extending upwardly to attach to a portion of the bottom wall 26 which slopes upwardly at the rear. A second vertical bracket 38 is bolted near the right front corner 40 of the cab-shell and extends downwardly for attachment to the rail 14. The brackets 35–38 form part of the energy dissipating structure, the function of which will be described more fully hereinafter.

As provided in the preferred embodiment of the invention, a pair of rigid restraining links 41–42, one pivotally attached to the outer horizontal bottom edge of cab-shell 20 and the other pivotally attached to the right rear vertical edge, extend downwardly and laterally for pivotal connection at their lower ends 43–44 to the left and right side rails respectively. The rigid link 41 is pivotally mounted at the upper end 45 to a longitudinally extending brace 46 which carries a mounting lug 47 approximately at the middle of the cab-shell. The left side rail 14 has a mounting lug 48 opposite lug 47 on which the lower end 43 of the link 41 is pivoted. Similarly, the link 42 is pivotally connected at its upper end 49 to a mounting lug 50 attached near the top of cab-shell 20 along the rear edge of side wall 28 and extends downwardly and laterally for pivotal mounting at its lower end 44 on a lug 51 carried on the right side rail 13.

Figure 2:
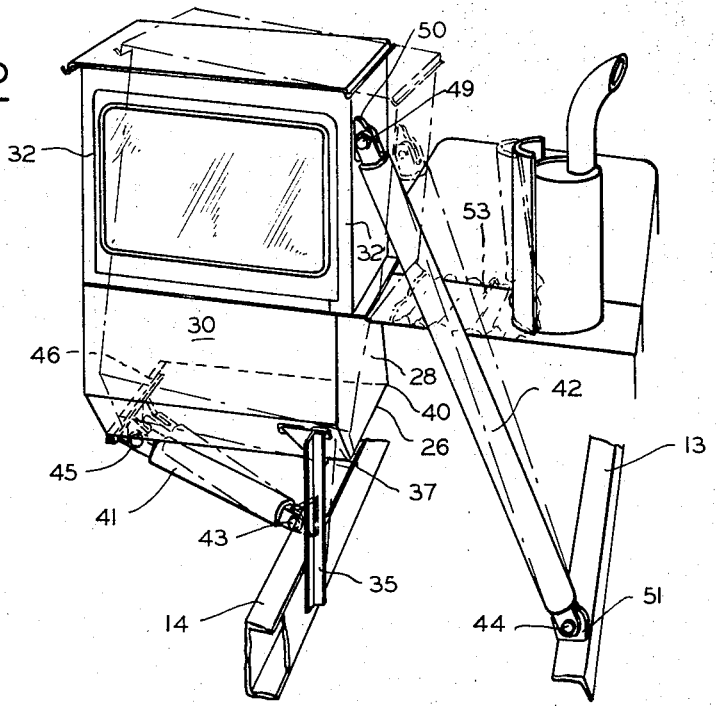
FIG. 2 is a fragmentary, rear perspective view of the cab-shell and restraining links depicted in full lines in the static state condition and in dot-dash lines the active or energy dissipating condition.

As will be appreciated by referring to FIG. 2, owing to the pivotal connection of the rigid links 41–42 with the side rails, the cab-shell will tend to pivot bodily about an axis between the lower ends of the links extending longitudinally parallel to the vehicle centerline were it not for the mounting brackets 35,38. Such supposed arcuate path of movement is depicted in the phantom view in FIG. 2 where it is assumed that a side load has been applied to the cab-shell of sufficient magnitude to cause it to deflect laterally. This would bend or distort the brackets 35,38 and pivot the links 41-42 upwardly and laterally in the direction of the applied force imparting a modified parallel motion to the cab-shell. The links however tend to rigidify the cab-shell and support it against collapse into the critical zones A, B, c while allowing it to distort somewhat and thus absorb some of the excess energy so long as the integrity of the critical zone is maintained.

It is further contemplated that the body structure of the vehicle in the supposed path of movement, for example, in FIG. 2, the body portion 53, is relatively lightly structured and will preferentially deform rather than cause the cab-shell to buckle, thus acting as a back-up or additional energy dissipating structure.

In case of a vertical downward loading on the cab-shell, such as might occur if the vehicle were to completely upset, the links 41–42 will pivot downwardly and outwardly and the distortion of the cab-shell and brackets 35,38 will occur in a corresponding direction.

In either case, links 41–42 are forced from a static state condition, where they are experiencing no active loading, to an active energy absorbing condition where they transmit forces to the side rails 13–14 in excess of that which would crush the cab-shell into the critical zones A, B, and C.

It will be appreciated that in designing the cab-shell for roll-over protection on a particular vehicle, one design criterion should be the maximum vehicle weight for the series of vehicles on which the cab-shell is to be used. That is, for tractor units of a line of self-propelled scrapers, the tractor weight may range from 15,500 pounds to 22,000 pounds. The minimum capacity of the roll-over protective structure then should be in excess of that energy absorption factor which will easily exceed the requirements of the heaviest prime mover on which the cab-shell is to be mounted. For example, for a 22,000 pound vehicle, the minimum calculated side load is 26,200 pounds and the minimum vertical load 22,000 pounds in a full roll-over situation. These loads would produce an actual lateral deflection of the shell at the top of less than 8 ½ inches and a vertical depression of about ¾ inch downwardly. From these forces and deflections, it can be determined that the minimum energy absorption should be about 223,000 inch pounds for this weight of vehicle. Accordingly, the energy absorption structure will be designed with this as the minimum energy dissipating capability.

While I have described and illustrated herein a preferred embodiment of my invention as incorporated in a particular mechanism, it will be appreciated that modifications may be made therein and that other uses may be found. Therefore, it should be understood that I intend to cover by the appended claims all such modifications as fall within the spirit and scope of my invention.

I claim:

1. In a vehicle having a frame structure including a pair of laterally spaced, longitudinally extending side rails on opposite sides of the vehicle centerline, a space above the frame structure, an operator's position in said space, a critical zone of protection for the operator extending fore and aft, vertically above and below and laterally on either side of said operator's position within which the operator will ordinarily be protected, the improvement comprising energy absorption means having a normally static state condition and an active energy absorption condition, said means including a protective structure for the operator enclosing interiorly thereof said critical zone and located above and offset laterally with respect to the side rails, an axis extending parallel to the centerline of the vehicle, portions of said means tending to pivot about said axis in case of loads applied to said protective structure in a direction transversely of said axis and above a minimum load, and restraining means connected to said portions permitting a degree of arcuate movement thereof about said axis in case said minimum load is exceeded including an elongated rigid element connected at one end to a lower portion of the protective structure and extending laterally and downwardly thereof an pivotally connecting at the lower end to one of said side rails whereby energy in excess of that which would otherwise cause the protective structure to crush into the critical zone is dissipated.

2. The improvement according to claim 1 wherein said restraining means includes a pair of rigid links pivotally connected at their lower ends to the frame side rails on opposite sides of the vehicle, said protective structure being laterally offset above the center line of the vehicle and the upper end of one link being pivotally connected to portions of said protective structure situated above and the other link connected below the critical zone of protection for the operator.

3. The improvement according to claim 2 wherein the one link is connected at its upper end on the inner side of said protective structure adjacent the vehicle centerline and extends laterally and downwardly across the centerline pivotally connecting to the side frame rail most remote from said protective structure and said other link is pivotally connected at its upper end on the outer side of said protective structure remote from the vehicle centerline and extends laterally and downwardly pivotally connecting to the side frame rail immediately adjacent the protective structure, each said link capable of pivoting in a vertical plane imparting a generally parallel type of motion to said protective structure when said minimum load is exceeded.

4. An off-highway vehicle comprising a body, a frame supporting the body, said frame having a pair of laterally space, longitudinally extending left and right side rails on opposite sides of the vehicle centerline, a shell structure for housing the operator having walls being spaced laterally, fore and aft and vertically from the operator's position therein, said shell structure being mounted above the side rails and off-set from the vehicle centerline, restraining means including a rigid elongated element pivotally mounted to one of the side rails and extending upwardly and laterally for connection with said shell structure and shell mounting means supporting the shell structure above the side rails, said restraining means permitting a degree of arcuate movement of the shell structure about an axis parallel to the vehicle centerline in case of a lateral or vertical load being applied to the shell structure in excess of a minimum load wherein said shell structure, restraining and support means tend to deflect and deform, dissipating energy in excess of that which would otherwise cause collapse of the shell structure into the operator.

5. An off-highway vehicle according to claim 4 wherein the axis about which shell structure can pivot is between the side rails and the shell structure is mounted outboard of the left side rail.

6. An off-highway vehicle according to claim 5 wherein said restraining means includes a pair of links, one attached adjacent the top of the shell structure and the other attached adjacent the bottom, said first mentioned link extending laterally downwardly and being pivotally connected at its lower end to the right side rail and said other link extending laterally and downwardly, being pivotally connected at its lower end to the left side rail.

7. An off-highway vehicle according to claim 6 wherein a portion of said vehicle body extends laterally of said shell structure and in case of arcuate movement thereof, is permitted to deflect and, in cooperation with said restraining and supporting means, tends to absorb a part of the excess energy.

* * * * *